United States Patent
Gribble et al.

(10) Patent No.: US 11,118,726 B2
(45) Date of Patent: Sep. 14, 2021

(54) SUPPORT APPARATUS

(71) Applicants: David Harold Gribble, Sunderland (CA); James A. Deveau, North York (CA)

(72) Inventors: David Harold Gribble, Sunderland (CA); James A. Deveau, North York (CA)

(*) Notice: Subject to any disclaimer, the term of this patent is extended or adjusted under 35 U.S.C. 154(b) by 93 days.

(21) Appl. No.: 16/623,529

(22) PCT Filed: May 23, 2018

(86) PCT No.: PCT/CA2018/050597
§ 371 (c)(1),
(2) Date: Dec. 17, 2019

(87) PCT Pub. No.: WO2018/232496
PCT Pub. Date: Dec. 27, 2018

(65) Prior Publication Data
US 2021/0145238 A1    May 20, 2021

(30) Foreign Application Priority Data
Jun. 21, 2017 (CA) .............................. CA 2971341

(51) Int. Cl.
*F16M 11/24*    (2006.01)
*F16M 11/16*    (2006.01)
*F16M 13/00*    (2006.01)

(52) U.S. Cl.
CPC ........... *F16M 11/242* (2013.01); *F16M 11/16* (2013.01); *F16M 13/00* (2013.01); *F16M 2200/027* (2013.01)

(58) Field of Classification Search
CPC ....... A47L 13/51; A47L 9/248; B25H 1/0042; A46B 17/02; A46B 15/0055; F16M 11/242; F16M 13/00; F16M 11/16; F16M 11/22; F16M 2200/027; F16M 11/245; A01B 1/00; A01B 1/02; A01D 7/00; A01D 9/00;
(Continued)

(56) References Cited

U.S. PATENT DOCUMENTS

| 5,482,247 A * | 1/1996 | Smith ................ A63B 69/3685 |
|  |  | 248/688 |
| 8,074,947 B2 * | 12/2011 | Cella ...................... B25H 3/006 |
|  |  | 248/146 |
| 9,302,386 B1 * | 4/2016 | Amanze ............... B25H 1/0042 |

(Continued)

*Primary Examiner* — Ingrid M Weinhold

(57) ABSTRACT

To support a handle of a tool in a generally upright position, there is provided an apparatus comprising a guide block releasably securable to the handle of the tool, the guide block having a top end, a bottom end, and a pair of longitudinal channels running there through and diverging from said top end toward said bottom end. A longitudinal slot is operatively associated with each of said channels. Each of said slots has a longitudinal first edge and a longitudinal curved edge. The apparatus includes a pair of rigid legs, each leg dimensioned to be slidably received through one of the channels, has a linear portion with a linear rail extending laterally therefrom and has a curved portion with a curved rail extending laterally therefrom. The linear rail and the curved rail of each leg engage within a respective slot when the legs are received through the guide block's channels.

16 Claims, 12 Drawing Sheets

(58) Field of Classification Search
CPC .. A01D 11/00; B25G 1/00; E01H 5/02; Y10T 16/44; B25B 11/00
USPC .................................................. 248/688, 682
See application file for complete search history.

(56) References Cited

U.S. PATENT DOCUMENTS

| | | | |
|---|---|---|---|
| 9,826,880 B1* | 11/2017 | Faraone | A46B 15/0055 |
| 10,288,216 B1* | 5/2019 | Amanze | A47L 13/51 |
| 2005/0056739 A1* | 3/2005 | Koning | F16M 11/046 |
| | | | 248/171 |
| 2008/0083681 A1* | 4/2008 | Cella | A01B 1/00 |
| | | | 211/70.6 |
| 2008/0093318 A1* | 4/2008 | Hansen | B25H 3/006 |
| | | | 211/70.6 |
| 2008/0135696 A1* | 6/2008 | LeMay | B25G 1/00 |
| | | | 248/170 |
| 2012/0137548 A1* | 6/2012 | Kimball | A01B 1/02 |
| | | | 37/266 |
| 2017/0089510 A1* | 3/2017 | Zenda | A01D 7/00 |

* cited by examiner

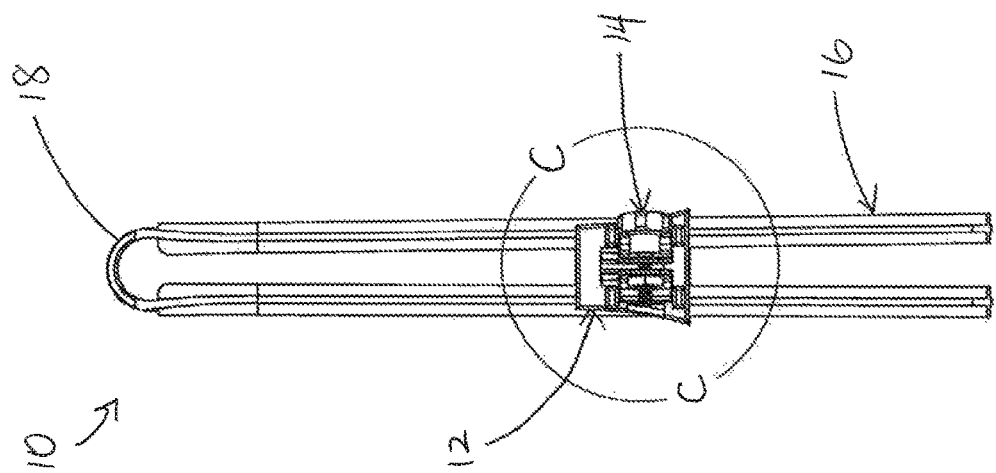
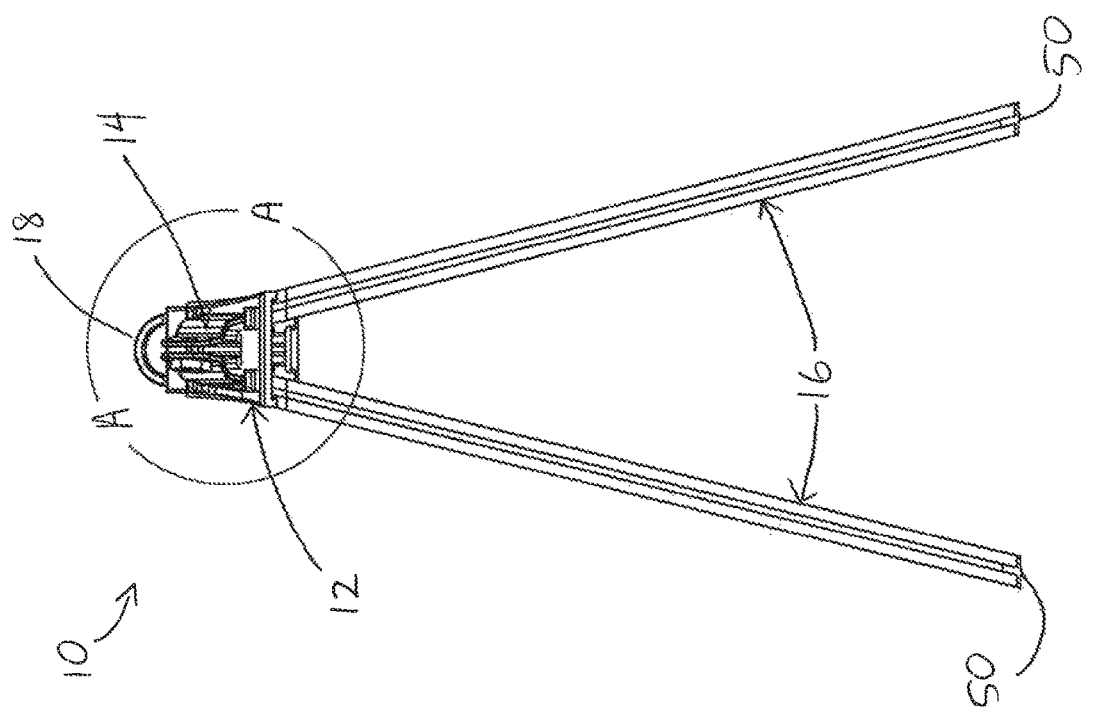

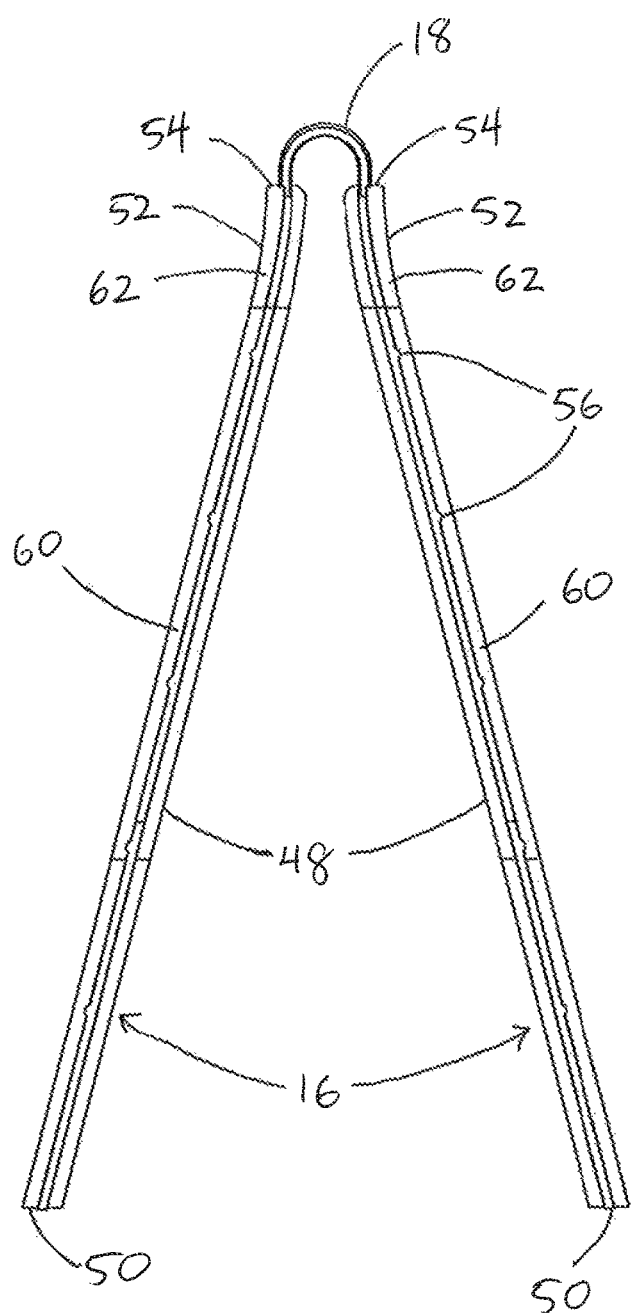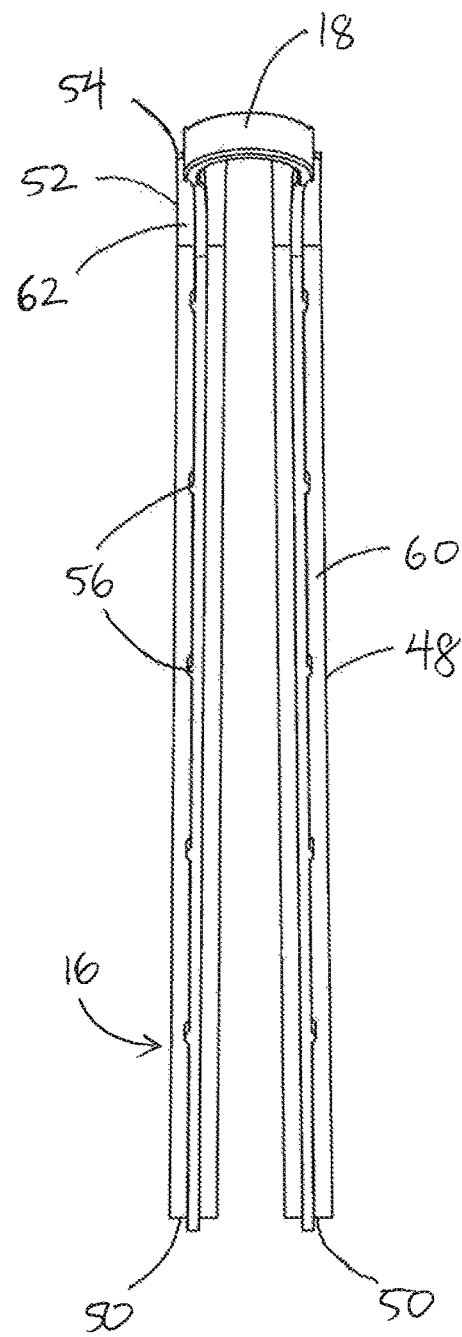
Fig. 7
Fig. 8

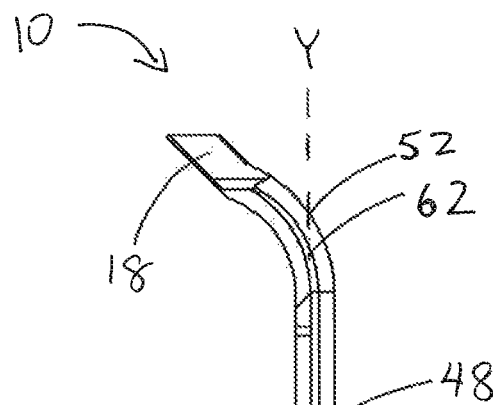
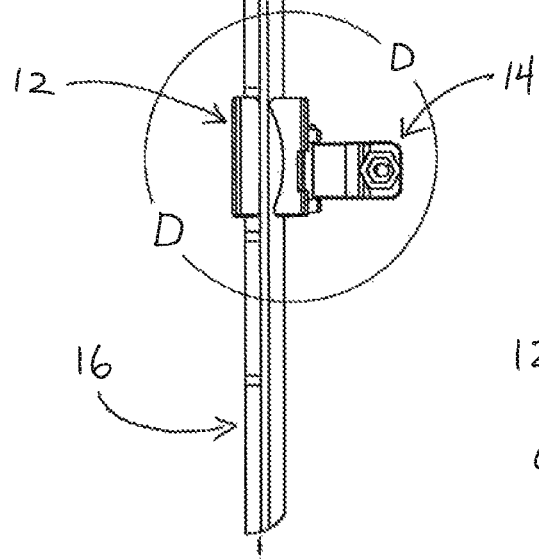
Fig. 12
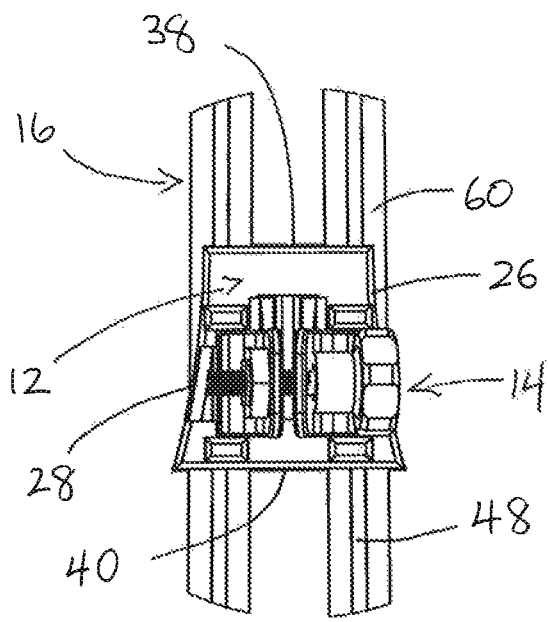
Fig. 13
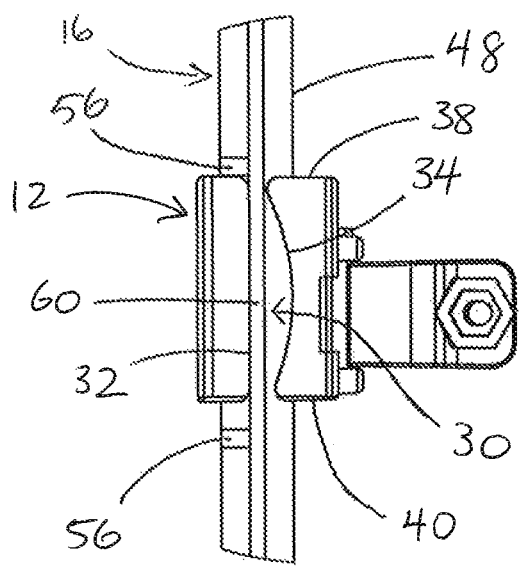
Fig. 14

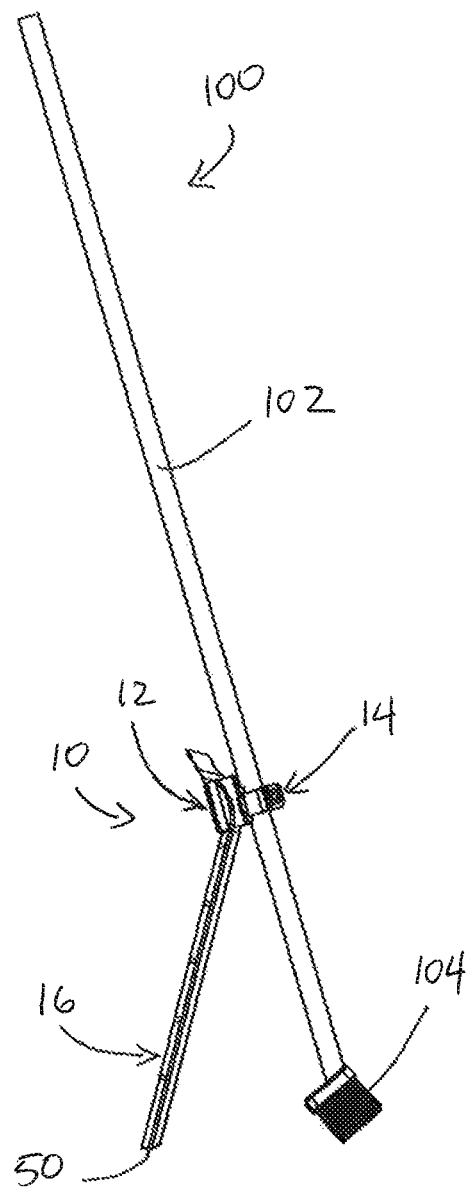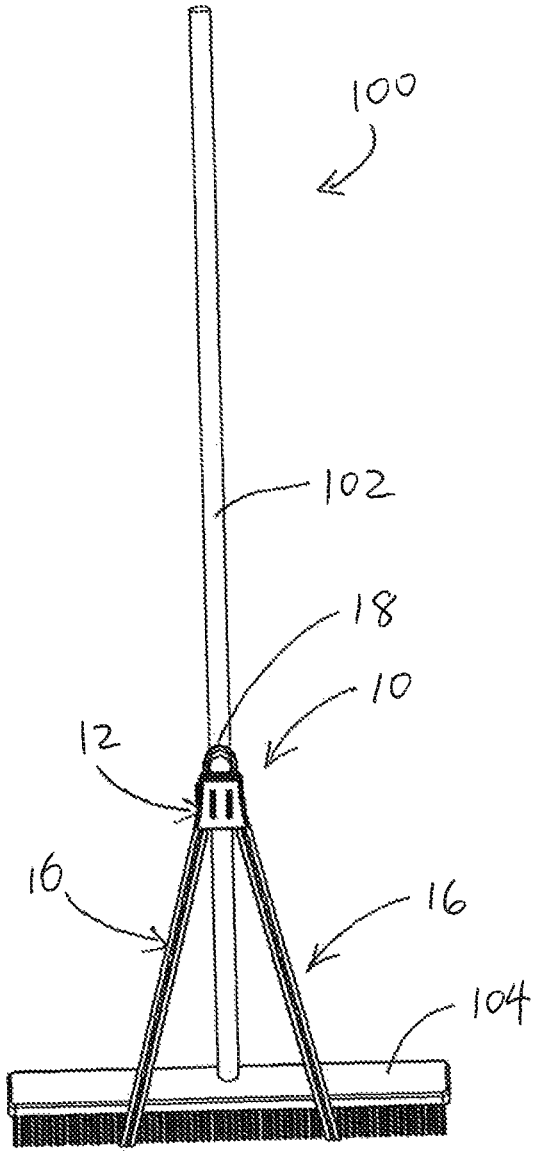

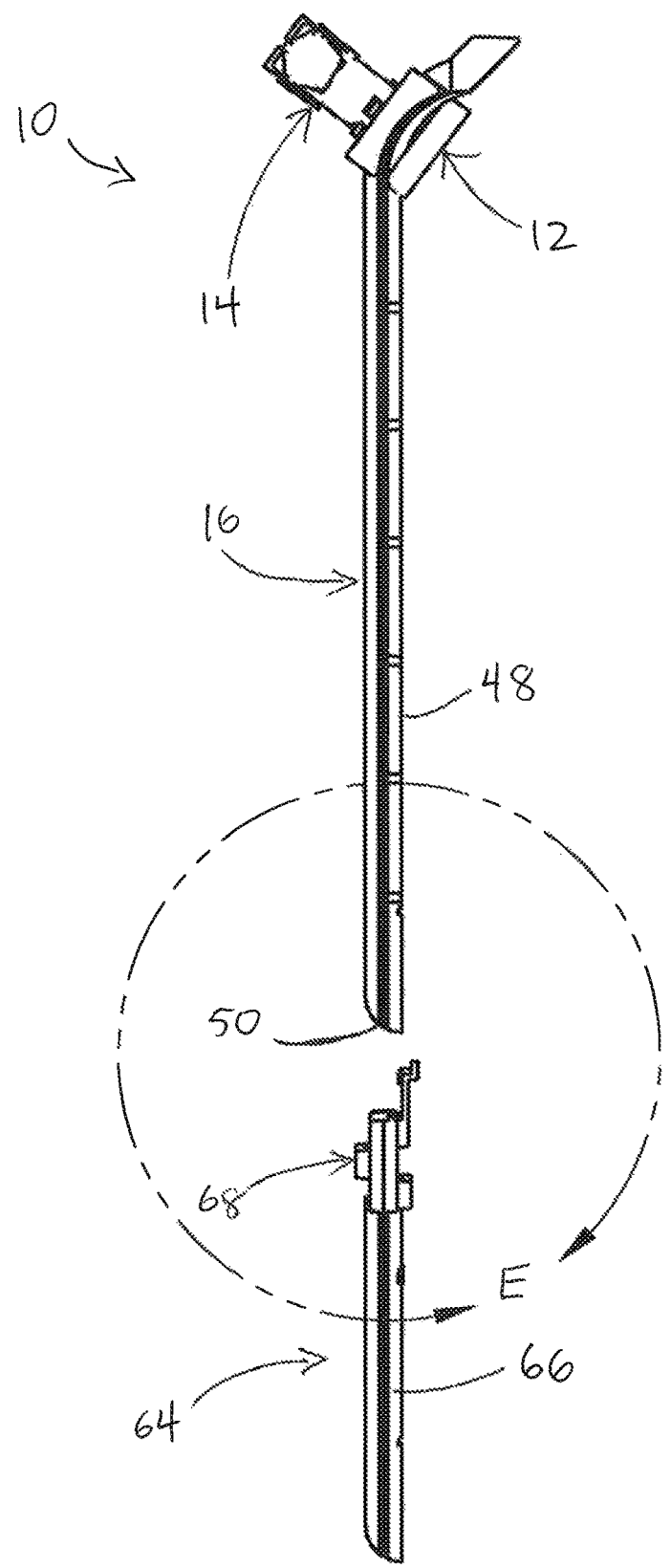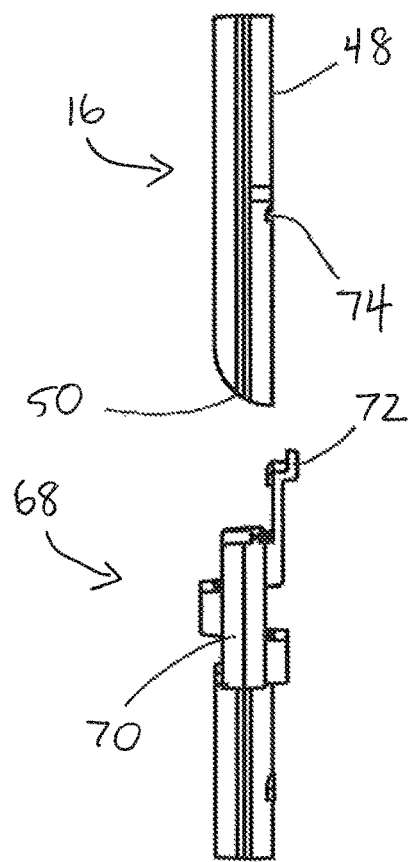
Fig. 21
Fig. 22

SUPPORT APPARATUS

FIELD

The present invention relates generally to a support apparatus for use with hand tools and other devices. In particular, the invention relates to a support apparatus attachable to a handle of a hand tool to maintain the handle in a generally upright position.

BACKGROUND

When using tools with elongated handles (such as brooms, garden rakes, etc.), it may be necessary to briefly stop for a period of time and perform a different task. At that point, the user may need to lay the tool down or to prop it against another object.

To place, and then to retrieve, such tools from a horizontal position may require the user to bend over or crouch down, which can lead to, or aggravate, back and/or joint problems. Such motions may also be difficult for people with certain physical restrictions or disabilities. Further, a wall or other object may not be conveniently located nearby to prop a tool against An apparatus to support such tools in a generally upright configuration when not in use is desirable.

SUMMARY

In one aspect the invention, there is provided an apparatus to support a handle of a tool in an upright or inclined position, the apparatus comprising (i) a guide block having a longitudinal axis; a top end; a bottom end; a front face; a rear face; a pair of longitudinal channels running therethrough between the front face and the rear face; and a first sidewall flanking one of said channels and an opposed second sidewall flanking the other of said channels, each of the first sidewall and the second sidewall including a slot having a longitudinal first edge and a longitudinal curved edge; (ii) a mounting bracket for releasably securing the guide block to the handle of the tool, (iii) a pair of rigid legs, each leg dimensioned to be slidably received through one of the channels in the guide block, each leg having a linear portion with a linear rail extending laterally therefrom, the linear portion terminating at a first end of the leg; a curved portion extending from the linear portion and terminating at a second end of the leg, the curved portion having a curved rail extending laterally therefrom, the linear rail and the curved rail of each leg configured for engagement within a respective slot in the first or second sidewalls when the legs are received through the channels in the guide block; and (iv) a biasing member connecting the second ends of the legs, said biasing member configured to bias the first ends of the legs away from one another.

In another aspect the invention provides an apparatus to support a handle of a tool in an upright or inclined position, the apparatus comprising (i) a guide block having; a longitudinal axis, a top end, a bottom end, a front face, a rear face, and a pair of longitudinal channels running therethrough between the front face and the rear face, said channels diverging in a direction from said top end toward said bottom end, and a longitudinal slot parallel to and operatively associated with each of said channels, each of said slots having a longitudinal first edge and a longitudinal curved edge; (ii) a mounting bracket for releasably securing the guide block to the handle of the tool, and (iii) a pair of rigid legs, each leg dimensioned to be slidably received through one of the channels in the guide block, each leg having a linear portion with a linear rail extending laterally therefrom, the linear portion terminating at a first end of the leg; a curved portion extending from the linear portion and terminating at a second end of the leg, the curved portion having a curved rail extending laterally therefrom; the linear rail and the curved rail of each leg configured for engagement within a respective slot when the legs are received through the channels in the guide block.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 1 is a front elevation view of a support apparatus in accordance with an embodiment of the invention in an extended configuration.

FIG. 2 is a front elevation view of the support apparatus of FIG. 1 in a retracted configuration.

FIG. 7 is a front elevation view of the legs and biasing member of FIG. 1 in isolation.

FIG. 8 is a front elevation view of the legs and biasing member of FIG. 2 in isolation.

FIG. 12 is a side elevation view of the support apparatus of FIG. 2.

FIG. 13 is an enlarged view of portion "C" of FIG. 2.

FIG. 14 is an enlarged view of portion "D" of FIG. 12.

FIG. 15 is a side elevation view of the support apparatus of FIG. 1 in use with a broom.

FIG. 16 is a front elevation view of the support apparatus and broom of FIG. 15.

FIG. 21 is a side elevation view of the support apparatus of FIG. 1 in use with an extension.

FIG. 22 is an enlarged view of portion "E" of FIG. 21.

DESCRIPTION

Figure 3:
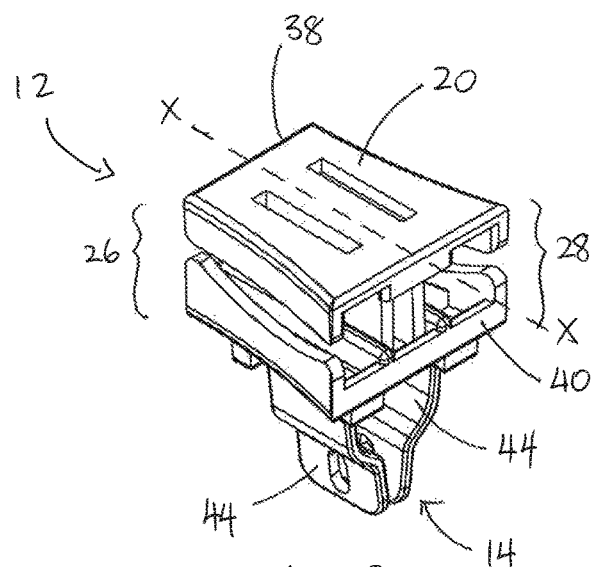
FIG. 3 is an enlarged, top perspective view of the guide block and mounting bracket of FIG. 1 in isolation.
Figure 4:
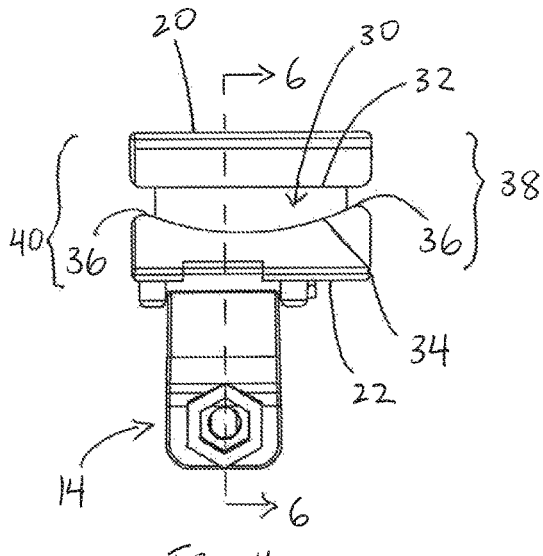
FIG. 4 is a side elevation view of the guide block and mounting bracket of FIG. 3.
Figure 5:
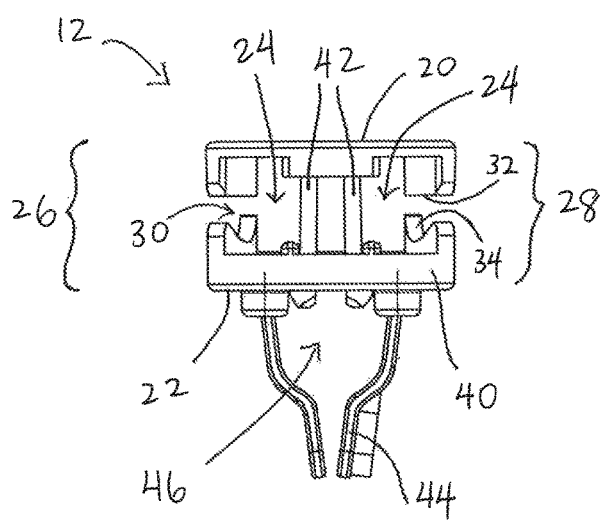
FIG. 5 is a bottom view of the guide block and mounting bracket of FIG. 3.
Figure 6:
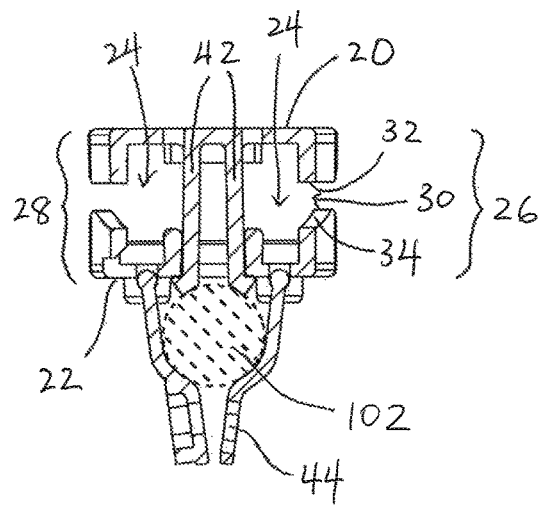
FIG. 6 is a cross-sectional view along line 6-6 of FIG. 4.
Figure 9:
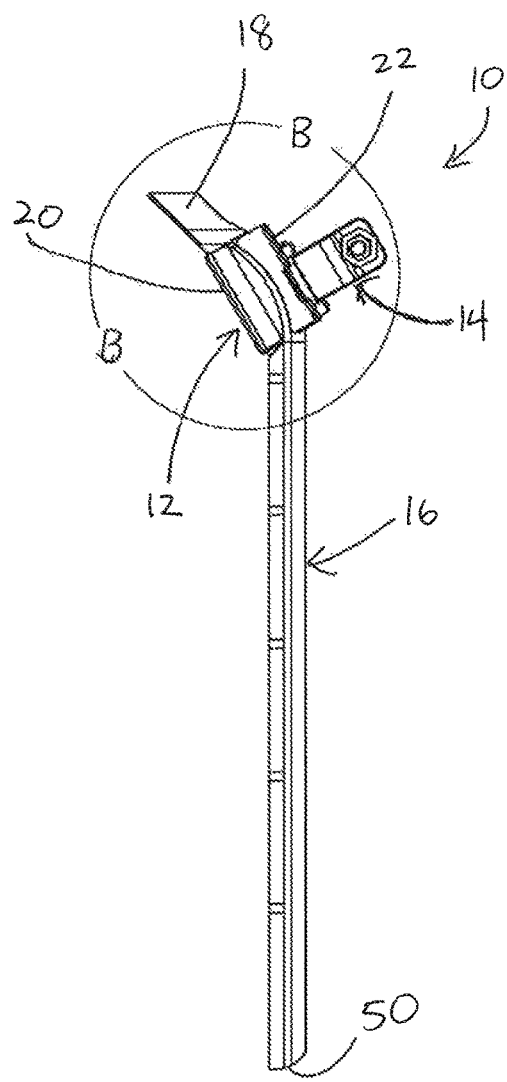
FIG. 9 is a side elevation view of the support apparatus of FIG. 1.
Figure 10:
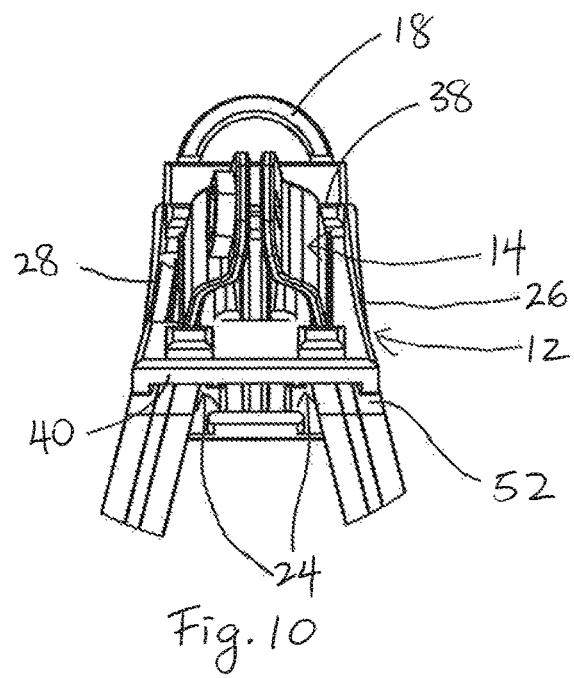
FIG. 10 is an enlarged view of portion "A" of FIG. 1.

The present invention may be embodied in a number of different forms. The specification and drawings that follow describe and disclose some of the specific forms of the invention.

FIGS. 1 and 2 show support apparatus 10 in accordance with an embodiment of the application, and in an extended and retracted configuration, respectively. Apparatus 10 comprises a guide block 12, a mounting bracket 14 coupled to guide block 12, a pair of rigid legs 16, and a biasing member 18 connecting legs 16.

FIGS. 3-6 show guide block 12 and mounting bracket 14 in isolation. Guide block 12 has a central longitudinal axis X, a front face 20, an opposed back or rear face 22, and a pair of longitudinal channels 24 laterally running therethrough, between front face 20 and rear face 22. As will be described in greater detail below, channels 24 receive legs 16. A first sidewall 26 and an opposed second sidewall 28 flank longitudinal channels 24. First sidewall 26 and second sidewall 28 each define a longitudinal slot 30 having a longitudinal first or straight edge 32 generally parallel to face 20, and a longitudinal curved edge 34 proximate rear face 22. The shape and curvature of curved edge 34 is selected to match or generally correspond to the shape and curvature of curved portions (as described below) of legs 16. Each curved edge 34 includes two points of contact 36 (see FIG. 4) with a corresponding leg 16 when legs 16 are received within longitudinal channels 24.

Guide block 12 further includes a top end 38 and a bottom end 40 that each connect first sidewall 26 with second sidewall 28. As shown, bottom end 40 extends laterally away from longitudinal axis X further than top end 38 such that bottom end 40 is wider than top end 38. In that manner, first sidewall 26 and second sidewall 28 diverge or taper away from longitudinal axis X as they extend from top end 38 towards bottom end 40. Similarly, longitudinal channels 24 also diverge or taper at an angle to longitudinal axis X of the guide block as they extend from top end 38 towards bottom end 40. As will be discussed below, this divergence encourages or helps to direct legs 16 away from one another when in their extended position.

In the depicted embodiment, guide block 12 further includes spacers 42 which extend between front face 20 and rear face 22, and generally between top end 38 and bottom end 40. Spacers 42 fix front face 20 and rear face 22 at a predetermined distance from one another and can act as a divider for longitudinal channels 24.

Mounting bracket 14 is coupled to, or extends from, guide block 12 from rear face 22, and is configured to releasably secure guide block 12 to a handle 102 of a tool. In the present embodiment, mounting bracket 14 comprises a pair of clamping arms 44 which define an opening 46 through which handle 102 of the tool is received (as indicated by the dashed lines in FIG. 6). Mounting bracket 14 also includes a fastening mechanism (a bolt and a washer for example), which may be used to tighten arms 44 about the handle 102. As will be understood by the skilled person, mounting bracket 14 may take an alternate form known in the art as long as it allows guide block 12 to be releasably secured to the handle of the tool with channels 24 generally parallel to handle 102.

The components of guide block 12 and mounting bracket 14 are depicted as separate components which are welded, glued, coupled or otherwise secured together. However, guide block 12 and mounting bracket 14 may be formed together as a single unit.

FIGS. 7-8 show rigid legs 16 and biasing member 18 in isolation. FIG. 7 shows rigid legs 16 as they would appear when in an extended configuration, having an inverted V-shape. FIG. 8 shows rigid legs 16 as they would appear when in a retracted configuration, where legs 16 are generally positioned in parallel with one another. Each rigid leg 16 is dimensioned to be slidably received through a respective one of longitudinal channels 24 in guide block 12.

Each leg 16 includes a linear portion 48, terminating at a first end 50, and a curved portion 52 extending from linear portion 48 and terminating at a second end 54.

Linear portions 48 are generally straight, however a slight curvature or variation from exactly 180° could exist. Linear portions 48 of legs 16 may include one or more detents or retainers 56 to maintain the legs at desired positions when received within the slots. Detents 56 may positioned at predetermined intervals along legs 16 to frictionally engage with top end 38 of guide block 12. In this manner, detents 56 can provide frictional resistance to limit sliding of legs 16 through guide block 12 at predetermined points when legs 16 are received within guide block 12.

The dimensions (i.e. shape and curvature) of curved portions 52 may be selected to match or correspond with the shape and curvature of curved edge 34 of slot 30. As best shown in FIG. 12, curved portions 52 on legs 16 curve away from a longitudinal axis Y of legs 16.

Each linear portion 48 further includes a linear rail 60 extending laterally or generally perpendicularly along its length. Each curved portion 52 includes a curved rail 62 extending laterally or generally perpendicularly along its length. Linear rails 60 and curved rails 62 are configured to engage with their respective slots 30 in first or second sidewall 26, 28 when legs 16 are received within longitudinal channels 24 in guide block 12. The perpendicular rails on each leg 16 create a cross or T-shaped cross-section along its length. In that regard, linear rails 60 and curved rails 62 also function to provide additional structural rigidity to legs 16.

Biasing member 18 connects second ends 54 of legs 16, and is configured to bias first ends 50 of legs 16 away from one another (see FIG. 7). In the depicted embodiment, biasing member 16 is a flexibly resilient loop configured to act as a torsion spring to pivotably bias first ends 50 of legs 16 away from one another. The loop may also form a handle which a user may grasp to slide legs 16 through guide block 12 in order to move legs 16 between a retracted configuration and an extended configuration.

It will be understood by the skilled person, however, that a biasing member of a different form may be used to connect second ends 54 and bias first ends 50 of legs 16 outwardly. Alternately, rather than a single element, a first connecting element may be used to connect second ends 54, while a second, separate, biasing element may be used to bias first ends 50 of legs 16 outwardly.

Biasing member 18 and legs 16 are depicted as separate components which are glued, welded, or otherwise secured, together. Alternately, biasing member 18 and legs 16 may be of uniform structure.

Figure 11:
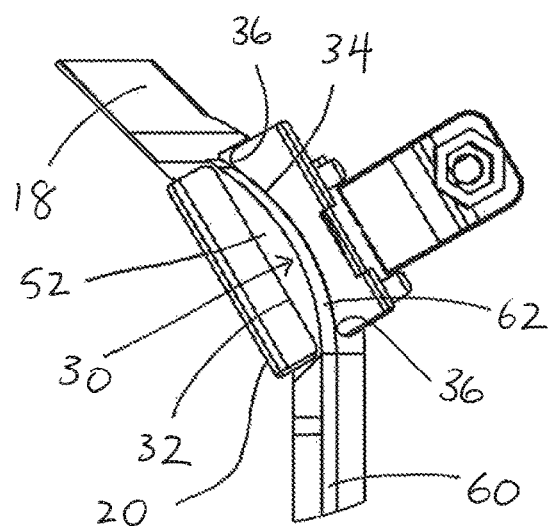
FIG. 11 is an enlarged view of portion "B" of FIG. 9.

As noted above, when legs 16 are received within guide block 12, they may be in an extended configuration (see FIGS. 1 and 9-11) or in a retracted configuration (see FIGS. 2 and 12-14). In the extended configuration, curved portions 52 of legs 16 are positioned within guide block 12 and curved rails 62 are engaged within their respective slots 30. As noted above, the shape and curvature of curved portions 52, and consequently curved rails 62, are selected to match or correspond with the shape and curvature of curved edges 34 of slots 30. In this manner, and as best seen in FIG. 11, curved rails 62 of each respective leg 16 may be slidably engaged by curved edge 34 within each slot 30. Points of contact 36 on curved edges 34 contact curved rails 62 and help to direct curved rails 62 through slots 30.

This configuration directs the position of legs 16 relative to guide block 12 in two ways.

First sidewall 26, sidewall 28, and each respective longitudinal channel 24 in guide block 12 taper away from longitudinal axis X as they extend from top end 38 towards bottom end 40. When curved portions 52 of legs 16 are positioned within channels 24, that taper, in conjunction with biasing member 18, causes legs 16 to extend away from one another in an inverted V-shape.

Secondly, with curved portions 52 positioned within channels 24, the curvature of curved portions 52 directs legs 16 to extend in a forward direction away from mounting bracket 14 when legs 16 are in an extended position.

In the retracted configuration (see FIGS. 2 and 12-14), linear portions 48 of legs 16 are positioned within channels 24 of guide block 12. First or straight edges 32 direct linear rails 60, and hence linear portions 48, of legs 16 into a generally parallel orientation, with longitudinal axis Y of legs 16 generally parallel to the longitudinal axis of guide block 12.

Figure 17:
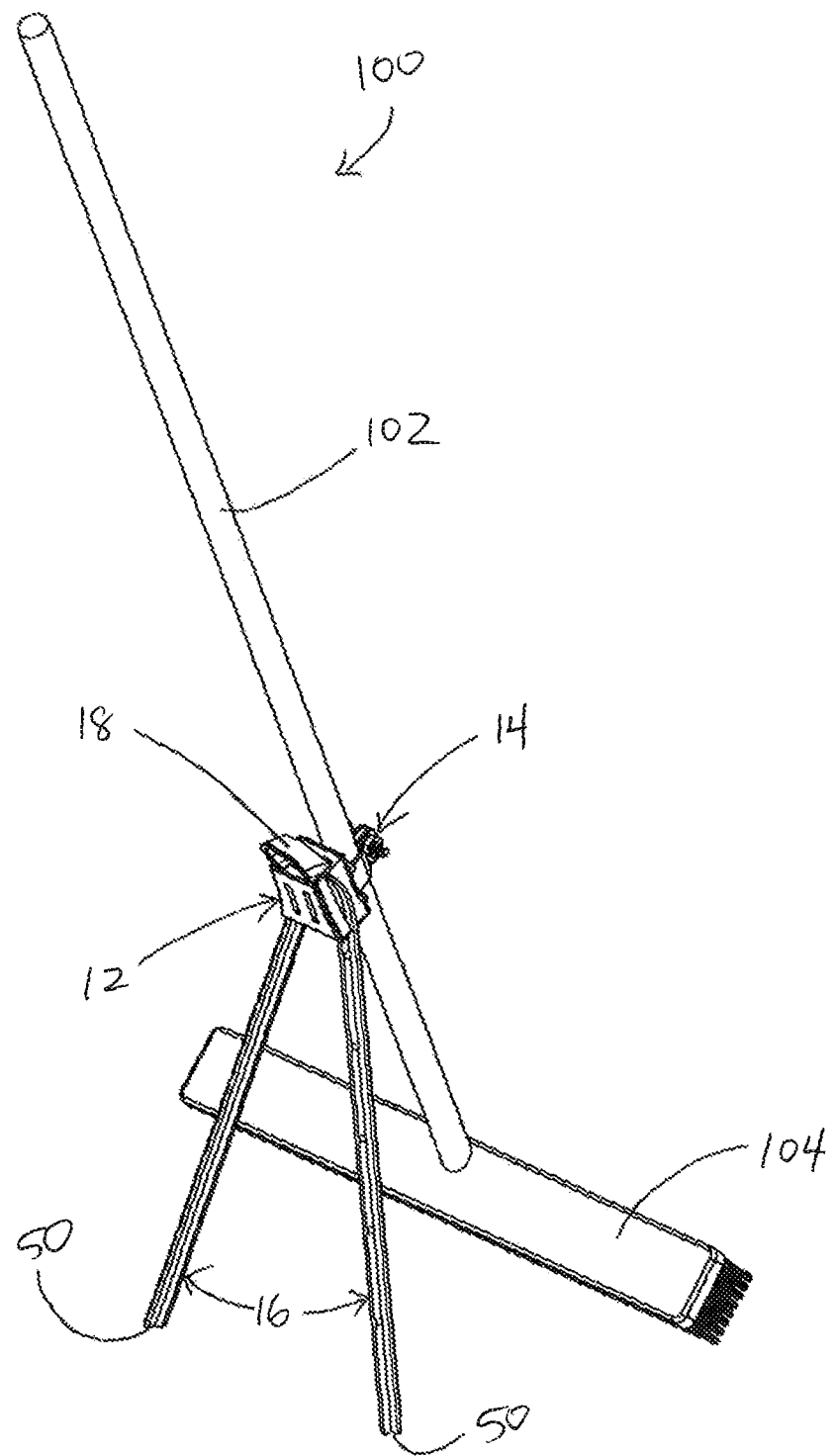
FIG. 17 is a front perspective view of the support apparatus and broom of FIG. 15.

FIGS. 15-17 depict apparatus 10 in the extended configuration in use with handle 102 of a tool 100 having a head 104. As shown, mounting bracket 14 is releasably secured to handle 102 and first ends 50 of legs 16 are pivoted away from each other and angled away from handle 102 so as to support handle 102 in a generally upright or inclined position. In this configuration, legs 16 and handle 102 collectively form the three "legs" of a tripod. Biasing member 18 helps to maintain legs 16 in an inverted V-shaped configuration and thereby helps to maintain apparatus 10 in the extended configuration.

Mounting bracket 14 may be used to position guide block 12 along handle 102 at various points along handle 102. Given the length of legs 16, the degree of incline at which tool 100 may be supported by apparatus 10 can thus be adjusted through varying the location of bracket 14 along the length of handle 102.

Figure 18:
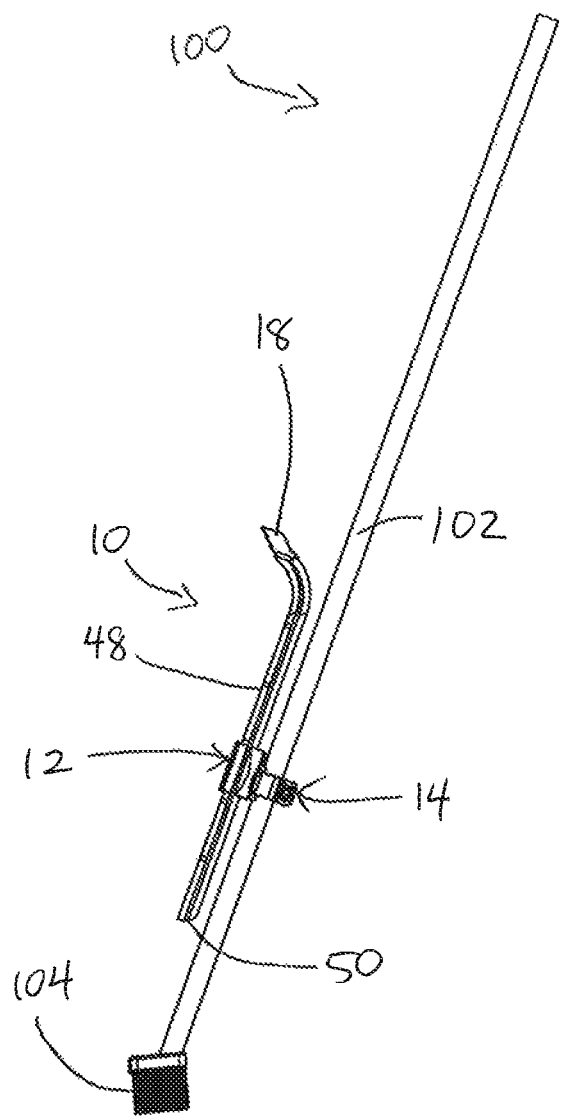
FIG. 18 is a side elevation view of the support apparatus of FIG. 2 in use with a broom.
Figure 19:
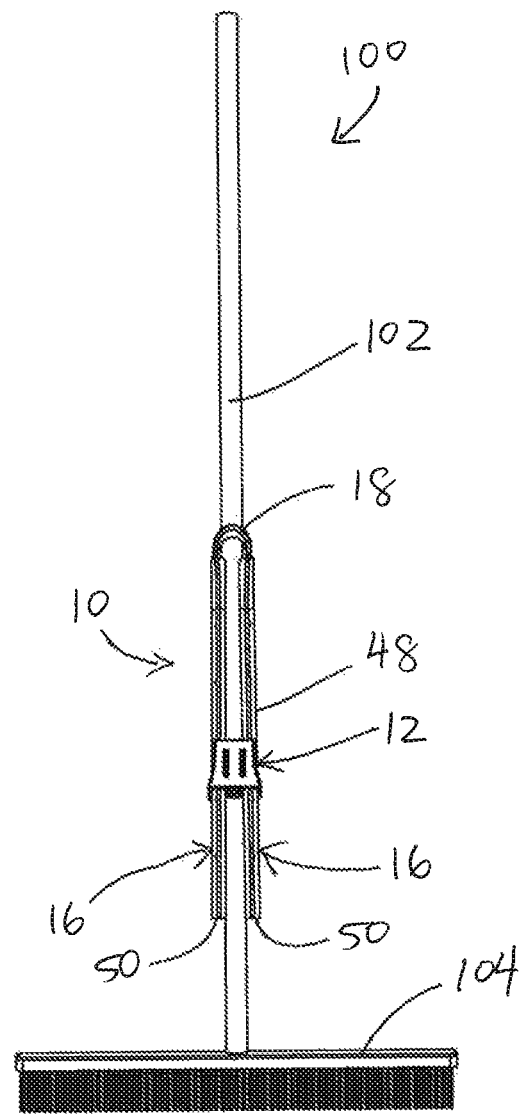
FIG. 19 is a front elevation view of the support apparatus and broom of FIG. 18.
Figure 20:
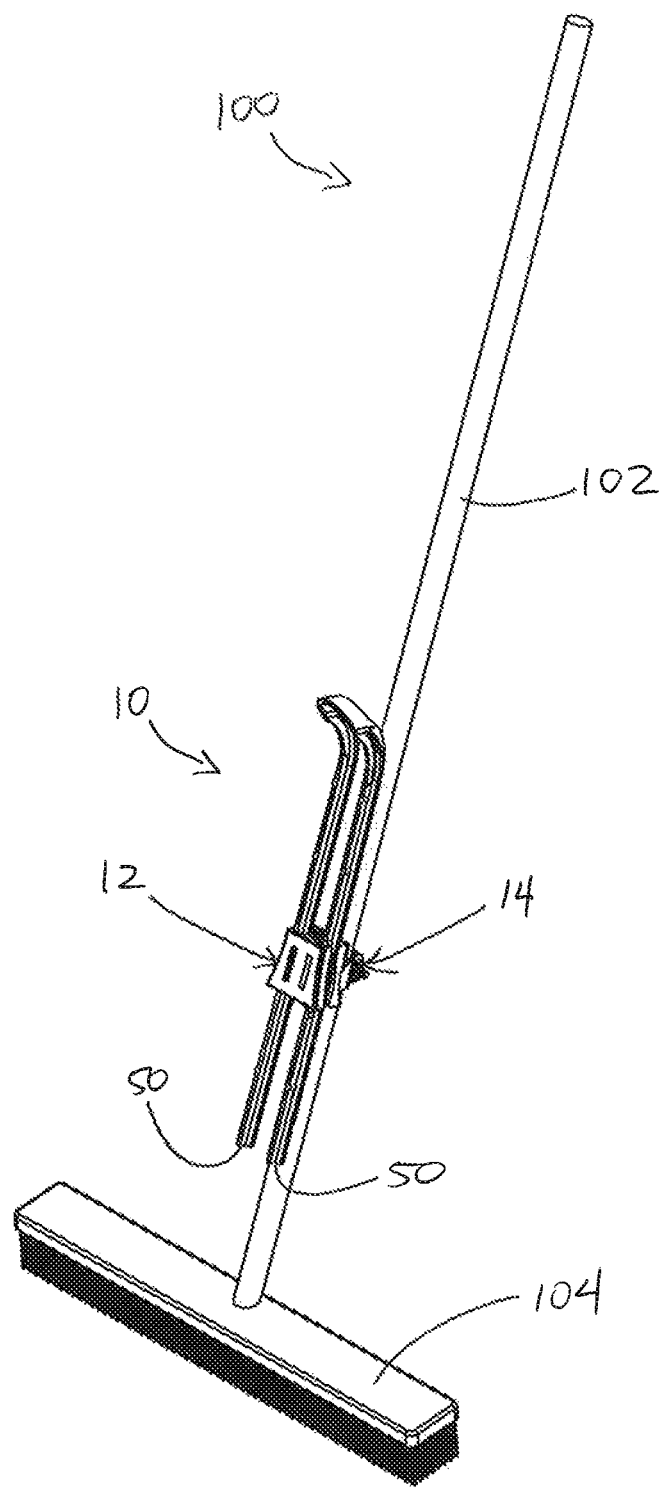
FIG. 20 is a front perspective view of the support apparatus and broom of FIG. 18.
Figure 23:
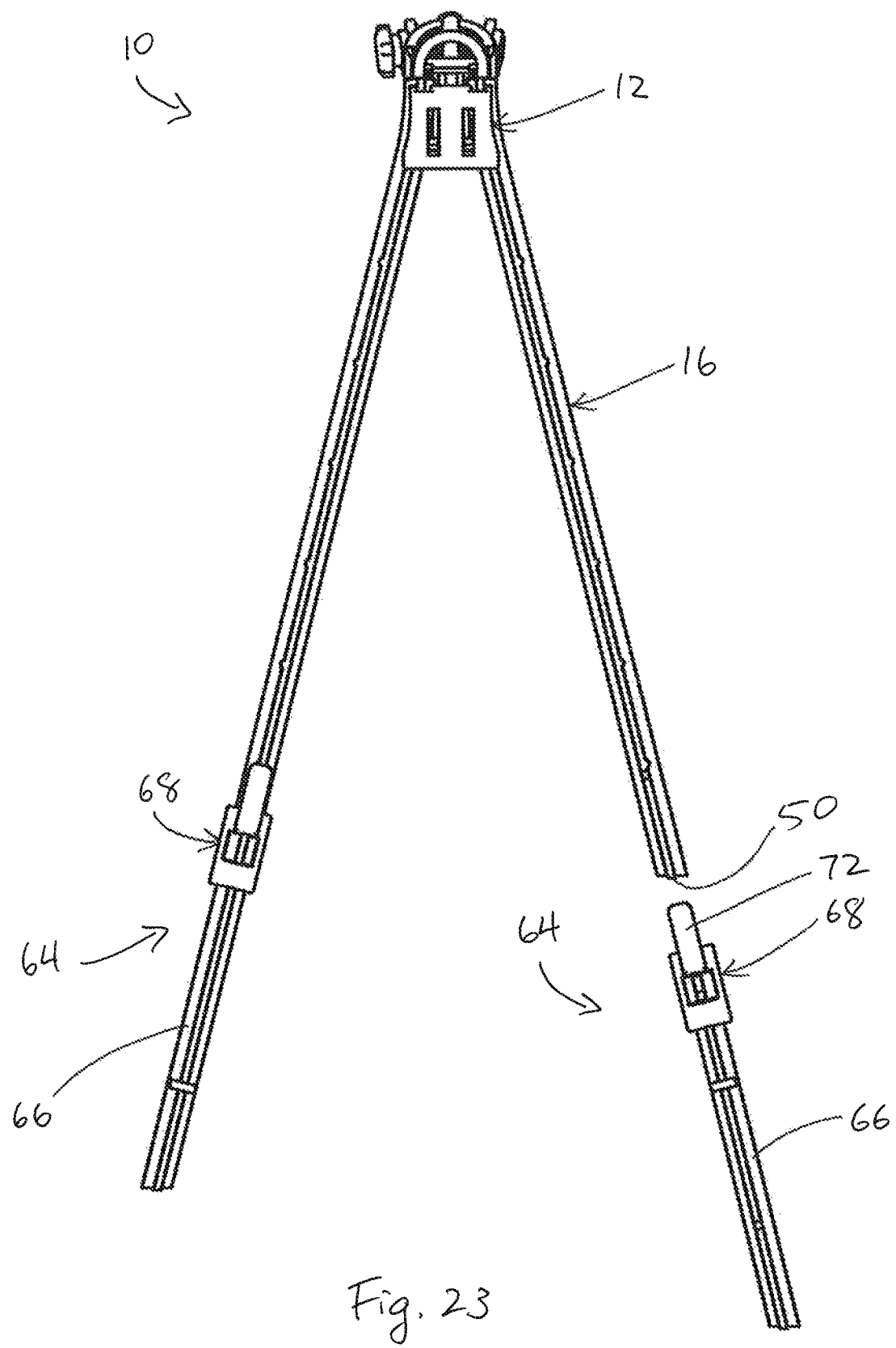
FIG. 23 is a front elevation view of the support apparatus of FIG. 21 in use with a pair of extensions.
Figure 24:
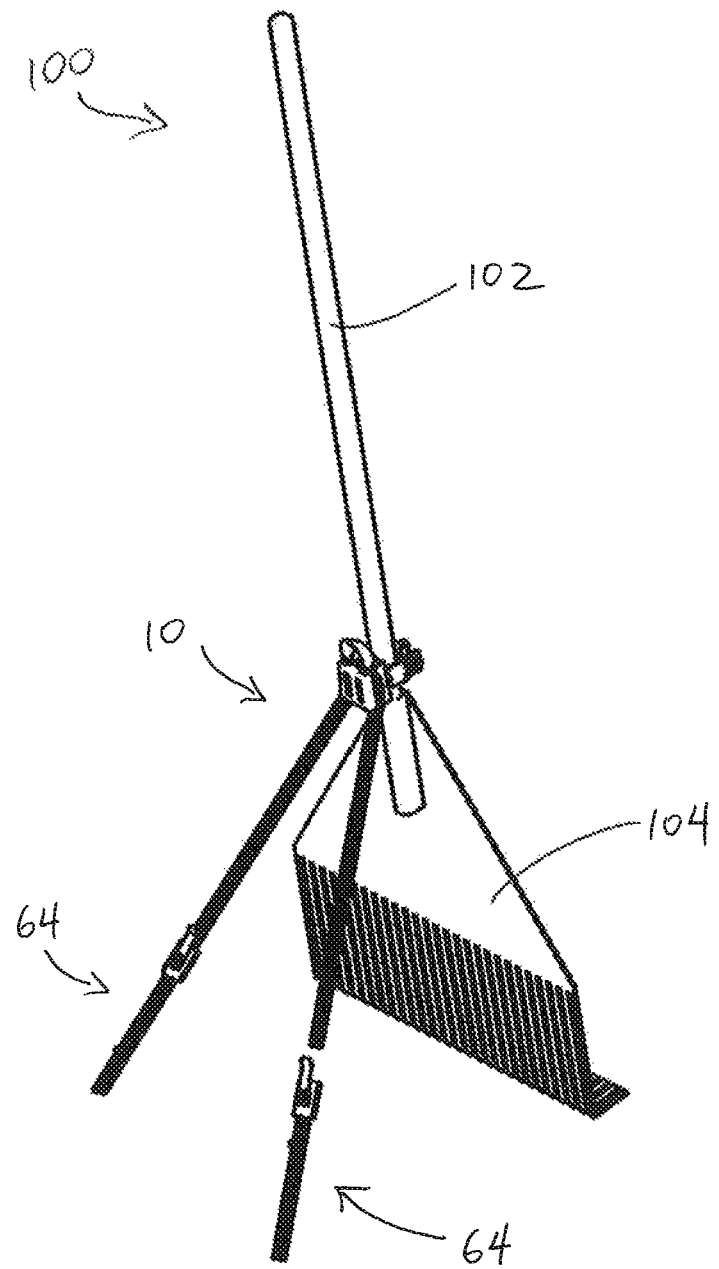
FIG. 24 is a front perspective view of the support apparatus and extensions of FIG. 23 in use with a rake.

FIGS. 18-20 depict apparatus 10 in the retracted configuration in use with handle 102 of tool 100. As shown, mounting bracket 14 is releasably secured to handle 102 essentially in the same position on handle 102 as shown in FIGS. 15-17. In the retracted configuration, linear portions 48 of legs 16 are positioned within guide block 12, with legs 16 aligned generally in parallel with one another and with handle 102. In the retracted configuration, first ends 50 of legs 16 and mounting bracket 14 are spaced apart from head 104 so as to not interfere with or obstruct the normal use of tool 100 by the user. It will be understood that mounting bracket 14 of apparatus 10 in the retracted configuration is positioned along handle 102 so as to also not interfere with a user's holding or gripping of handle 102 when using tool 100.

Detents 56 on legs 16 provide points of resistance between legs 16 and guide block 12 to assist in retaining legs 16 in the retracted position. As legs 16 are biased away from one another within guide block 12, detents 56 tend to "catch" or engage with top end 38 (see FIG. 14 for example) of guide block 12, thereby helping to retain legs 16 in a generally parallel position relative to handle 102 as tool 100 is used in the normal course. Detents 56 may be positioned along legs 16 at regular intervals such that legs 16 may be retracted through guide block 12 at varying increments.

The particular embodiment depicted shows biasing member 18 to be in the form of a loop which may be grasped as a handle by a user to single-handedly slide legs 16 through guide block 12 in one motion. Other structures for sliding legs 16 through guide block 12 to move legs 16 between the retracted configuration and extended configurations may alternately be used.

To move legs 16 from the retracted configuration to the extended configuration, the user simply pushes biasing member 18 (depicted in the Figures as a loop) towards guide block 12, sliding legs 16 therethrough. When biasing member 18 is brought proximate or adjacent guide block 12, first ends 50 of legs 16 pivot away from each other due to the biasing force of biasing member 18 and the tapering of channels 24. Legs 16 also angle away from back face 22 due to the engagement of curved rails 62 with curved edges 34 of slots 30. As described above, a tri-pod formation is thus formed with tool 100.

In some applications, apparatus 10 may further include a pair of extensions 64, one releasably attached to each leg 16, as shown in FIGS. 21-24. Each extension 64 includes an additional linear portion 66 and a coupler 68 fixed to an end of linear portion 66. In the depicted embodiment, additional linear portion 66 has a similar cross-section as leg 16, however, other configurations could be utilized.

Coupler 68 is configured to releasably engage one of legs 16 proximate first end 50, and to thereby extend the overall length of leg 16. As shown in FIG. 22, coupler 68 may have a housing 70, for receiving first end 50 and a portion of leg 16. Coupler 68 may also include a fastener or clip, for releasably securing linear portion 66 to linear portion 48. In the depicted embodiment, the fastener or clip is of a cantilever snap-fit variety, having a resiliently biased lever 72 which engages a dimple 74 situated on linear portion 48. In this manner, when the lower or first end 50 of linear portion 48 is positioned within housing 70, lever 72 will engage dimple 74 to secure linear portion 66 to linear portion 48. In an alternate embodiment, coupler 68 may comprise a different fastening mechanism and/or structure to couple linear portion 66 to linear portion 48.

While a single pair of extensions 64 are shown, multiple extensions may be releasably secured to one another and coupled to each leg 16. Adding a pair (or multiple pairs) of extensions allows apparatus 10 to be mounted further up handle 102. This may be useful for items such as fan rakes where the height of tool head 104 may not allow apparatus 10 to be mounted at a convenient height to hold tool 100 in a generally vertical or upright position. In such cases, extensions 64 may be used to extend the overall length of legs 16 to allow handle 102 to be supported in a generally upright position.

In the depicted embodiments, tool 100 is shown to be a push broom or a garden rake. It will be well understood that apparatus 10 may be used with a number of different hand-held tools having an elongate handle, including but not limited to shovels, mops, brush brooms, garden hoes, squeegees etc. It should further be appreciated that while slots 30 have been described and are shown as being integrated into sidewalls 26 and 28, in an alternate embodiment both slots 30 and channels 24 may be contained completely within guide block 12. In such instances the top 38 and the bottom 40 may be the same length, with the guide block being generally square or rectangular in shape. Further, it will also be appreciated that in such instances channels 24 may be formed within guide block in a manner such that they diverge in a direction from top 38 to bottom 40 as described above.

It is to be understood that what has been described are the preferred embodiments of the invention. The scope of the claims should not be limited by the preferred embodiments set forth above, but should be given the broadest interpretation consistent with the description as a whole.

The invention claimed is:

1. An apparatus to support a handle of a tool in an upright or inclined position, the apparatus comprising:
   (i) a guide block having:
      a longitudinal axis, a top end, a bottom end, a front face, a rear face, and a pair of longitudinal channels running therethrough between the front face and the rear face, and
      a first sidewall flanking one of said channels and an opposed second sidewall flanking the other of said channels, each of the first sidewall and the second sidewall including a slot having a longitudinal first edge and a longitudinal curved edge;
   (ii) a mounting bracket for releasably securing the guide block to the handle of the tool,
   (iii) a pair of rigid legs, each leg dimensioned to be slidably received through one of the channels in the guide block respectively, each leg having:
      a linear portion with a linear rail extending laterally therefrom, the linear portion terminating at a first end of the leg,
      a curved portion extending from the linear portion and terminating at a second end of the leg, the curved portion having a curved rail extending laterally therefrom,
      the linear rail and the curved rail of each leg configured for engagement within one of the slots respectively in the first or second sidewalls when the legs are received through the channels in the guide block; and
   (iv) a biasing member connecting the second ends of the legs, said biasing member configured to bias the first ends of the legs away from one another.

2. The apparatus of claim 1 wherein the legs have:
   a retracted position where the linear portions of the legs are positioned within the channels of the guide block, the first edge of each slot engaging the linear rail of a respective leg to align the legs generally, parallel with one another, and
   an extended position where the curved portions of the legs are positioned within the channels of the guide block, the curved edge of each slot engaging the curved rail of a respective leg, permitting the biasing member to bias the first ends of the legs away from one another, the curved portions directing the legs at an angle away from the handle so as to support the handle in the upright or inclined position.

3. The apparatus of claim 1, wherein the shape and curvature of the curved rails generally correspond with the shape and curvature of the curved edges in the first side wall and in the second sidewall.

4. The apparatus of claim 2, wherein the biasing member connecting the respective second ends is a loop configured to act as a torsion spring.

5. The apparatus of claim 4 wherein the loop forms a handle which a user may grasp to slide the legs through the guide block to move said legs from the retracted position to the extended position, and from the extended position to the retracted position.

6. The apparatus of claim 2, wherein the longitudinal channels diverge in a direction toward said bottom end to help direct the linear portions of the legs away from one another to form an inverted V-shaped configuration when the apparatus is in the extended position.

7. The apparatus of claim 2, wherein the linear portions of the legs include one or more detents which provide frictional resistance to limit sliding of the legs through the guiding block.

8. The apparatus of claim 1, wherein the mounting bracket is configured to secure the guide block to the handle of the tool such that the longitudinal channels are maintained generally in parallel to the handle of the tool.

9. The apparatus of claim 1, wherein the guide block further includes spacers extending between the front face and the rear face to fix the front face at a predetermined distance from the rear face.

10. The apparatus of claim 1, further comprising a pair of extensions, one of the pair of extensions releasably securable at the first end of each of the legs respectively to extend the overall length of each leg.

11. The apparatus of claim 10, wherein each extension includes a coupler for releasably securing the extension to the first end of one of the legs.

12. An apparatus to support a handle of a tool in an upright or inclined position, the apparatus comprising:
   (i) a guide block having:
      a longitudinal axis, a top end, a bottom end, a front face, a rear face, and a pair of longitudinal channels running therethrough between the front face and the rear face, said channels diverging in a direction from said top end toward said bottom end, and
      a pair of longitudinal slots parallel to and operatively associated with each of said channels respectively, each of said slots having a longitudinal first edge and a longitudinal curved edge;
   (ii) a mounting bracket for releasably securing the guide block to the handle of the tool, and
   (iii) a pair of rigid legs, each leg dimensioned to be slidably received through one of the channels in the guide block respectively, each leg having:
      a linear portion with a linear rail extending laterally therefrom, the linear portion terminating at a first end of the leg, a curved portion extending from the linear portion and terminating at a second end of the leg, the curved portion having a curved rail extending laterally therefrom,
      the linear rail and the curved rail of each leg configured for engagement within one of the slots respectively when the legs are received through the channels in the guide block.

13. The apparatus as claimed in claim 12 including a biasing member connecting the second ends of the legs, said biasing member configured to bias the first ends of the legs away from one another.

14. The apparatus of claim 13 wherein the legs have:
   a retracted position where the linear portions of the legs are positioned within the channels of the guide block, the first edge of each slot engaging the linear rail of a respective leg to align the legs generally parallel with one another, and
   an extended position where the curved portions of the legs are positioned within the channels of the guide block, the curved edge of each slot engaging the curved rail of a respective leg, permitting the biasing member to bias the first ends of the legs away from one another, the curved portions directing the legs at an angle away from the handle so as to support the handle in the upright or inclined position.

15. The apparatus of claim 12 wherein at least one of said legs and said guide block includes one or more retainers to maintain said legs at desired positions when received within said slots.

16. The apparatus of claim 14 wherein said biasing member further forms a handle which a user may grasp to move said legs from the retracted position to the extended position, and from the extended position to the retracted position.

* * * * *